3,190,106
TUBE BENDING MANDREL

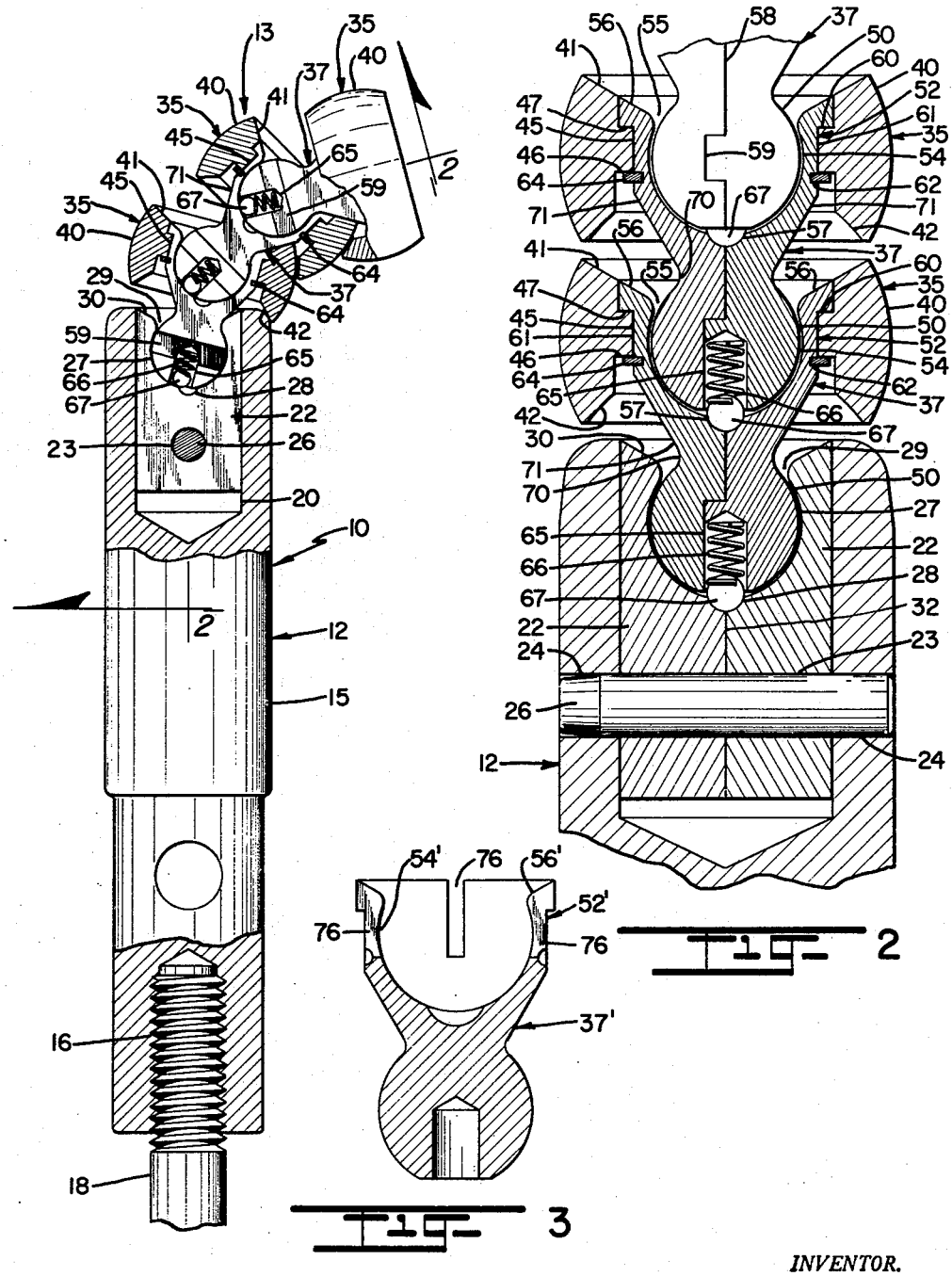

Henry M. Spates, Englewood, Colo., assignor to H & H Engineering Company, Denver, Colo., a corporation of Colorado
Filed Dec. 22, 1961, Ser. No. 161,541
10 Claims. (Cl. 72—466)

This invention relates to a novel and improved flexible mandrel for use in bending tubular members and more specifically relates to a high strength, universal mandrel adaptable for bending tubular members of metal composition.

It is a principal object of the present invention to provide for a high strength, tube bending mandrel which is characterized by its universal application in making internal diameter bends in tubular members in a rapid and dependable manner.

It is another object of the present invention to provide for a tube bending mandrel of the link type which is easily adjustable in length and degree of bending, is adapted for making continuous compound or tangential bends and is ideally suited for high production, assembly line use.

It is a further object to make provision for a high strength, universal mandrel which is economical to manufacture, easily assembled and disassembled, for making smooth internal diameter bends in tubular members of metal composition.

It is an additional object of the present invention to provide for a tube bending mandrel comprised of a series of interconnected flexible links normally aligned in straight, axial relation but which are capable of bending to virtually any degree required in a novel and unique manner and where the entire mandrel construction is characterized by its high strength, rugged properties and its ability to maintain a constant center line radius in bending in any desired direction.

The above and other objects of the present invention will become more readily understood from the following detailed description taken together with the accompanying drawing, in which:

FIGURE 1 is an elevational view, partially in section, of a tube bending mandrel, in accordance with the present invention;

FIGURE 2 is a detailed, enlarged view in section taken on lines 2—2 of FIGURE 1; and FIGURE 3 is a front view in section of an alternate form of ball link construction, in accordance with the present invention.

Referring in detail to the drawing, there is shown by way of illustrative example in FIGURES 1 and 2 a tube bending mandrel 10 made up of a straight mandrel section 12 and a flexible link section 13. The straight mandrel section is comprised of a shank 15 having a threaded opening 16 at its leading end to accommodate a stem 18, and an opposite counterbored portion 20 at its opposite end to accommodate a socket 22 which socket is specially designed to serve as a means of interconnection between the straight mandrel section 12 and flexible link section 13. Specifically, the elongate socket 22 has a transverse opening 23 at its inner end for alignment with opposite transverse openings 24 in the wall of the counterbored portion in order to accommodate a locking pin 26 for holding the socket in fixed relation to the mandrel section. At its outer end, the socket includes a spherical recess 27 having a slight depression 28, a limited mouth area 29 and an outwardly flared end surface 30. Preferably, the socket is longitudinally divided or split along its length, as at 32, so as to be comprised of two longitudinal halves having a laterally offset or key portion to align the halves in connected relation, and in this way to permit radial expansion of the socket especially around the limited mouth area, for a purpose to be described.

The flexible link section 13 is comprised of a series of spherical ring members 35 and a corresponding series of inner concentric ball link members 37 which serve to flexibly interconnect the spherical rings 35 in spaced, axial relation. Each spherical ring is in the form of an annular, thick-walled member of limited length having an outer spherical or convex surface 40, an inclined end surface 41 and an opposite cup-shaped end 42 providing a concave annular surface complementary to the curvature of the outer convex surface portion 40. The inner surface of each ring has an inward stepped portion 45 which forms with the cup-shaped end portion a relatively broad shoulder surface 46, and an annular ledge 47 is formed at the opposite end with the end portion 41.

Ball links 37, each being made up of a ball end portion 50 and opposite socket end portion 52, are designed for interconnection in end-to-end relation and where the socket end portions 52 also serve as a means of support for the ring members 35. Each socket end 52 is broadly formed in the same manner as the socket end portion 22 having a spherical recess 54 terminating in a limited mouth area 55 and flared end surface 56, and again a depression 57 is located within the recess symmetrically about the center line of each ball link. The outer surface includes an external ledge 60 complementary to the ledge 47 of the ring, an intermediate cylindrical surface 61 dimensioned to correspond with the inner surface 45 of the ring, and a locking groove 62 is disposed on the external surface of the socket opposite the broad shoulder portion 46 to accommodate an annular lock ring 64 which in cooperation with the opposite ledges 60 and 47 will lock the spherical ring in fixed relation to the socket end portion.

The opposite ball end 50 generally corresponds in size and configuration with the spherical recess portion 54 but is preferably of slightly smaller size as indicated and the ball end includes at its outer extremity a counterbored portion 65 to accommodate a ball detent assembly including a spring 66 and ball 67 biased outwardly to seat against the depression 57 and to operate as a means for normally holding the ball end 50 in fixed coaxial relation with each next successive socket end portion. The opposite end of the ball end 50 continues into a limited neck area 70 and a conical surface 71 which actually forms the outer wall portion of the socket and surrounds the innermost end of the recess. In this relation, it will be noted that the mouth area 55 of each socket is flared as at 56 so that once each ball detent assembly is released, each respective ball end 50 will be able to bend freely and will be limited in movement only when the flared end surface 56 moves into contact with the conical surface portion 71, since the outer spherical surfaces 40 are free to move inwardly along the concave surfaces of each next adjacent spherical ring portion or ring member.

To permit interconnection of the ball links, each is preferably formed of two longitudinal halves so that in connected relation they will have a common line of division 58 together with a laterally offset, key portion 59, and thus each is formed essentially in the same manner as the socket 22. As a result, when the ball ends are inserted into the socket ends, the sockets are free to undergo radial expansion under the urging of the balls against the flared ends of the sockets. Once in connected relation, the rings are passed over the ball ends and into interfitting relation with the external surface of the socket end. The lock ring 64 is then snapped in place to establish the desired interlocking relation between the spherical ring and the socket end. The spherical ring will of course prevent expansion of the socket end so as to prevent accidental removal of the ball, once the ring and ball link members are interconnected, and the key portions 59 will absorb any tension imparted to the ball links during the tube bending operation and prevent longitudinal separation of the halves.

An alternate form of ball link construction is shown in FIGURE 3, again to permit radial expansion of the socket end 52' for insertion of a ball end as in the preferred form. To avoid the necessity of constructing the ball link in two halves, the alternate form of ball link 37' is of one-piece construction, and the wall of the socket is split or divided at spaced circumferential intervals to form longitudinal slits 76 extending substantially the length of the recess 54'. Accordingly, the socket is again free to expand as the ball end is forced against its outer inclined surface 56'. In succession, each ball is inserted into a socket end before locating and locking each respective spherical ring in place until the desired number of flexible ball link members are assembled. The last ball end portion is then inserted in the same manner into the socket end 22 prior to insertion of the socket end portion into the opening 20 in the straight mandrel section. Once the ball end is in place, and upon insertion of the socket 22 into the opening 20, the locking pin will then be positioned in the openings 23 and 24 to establish complete interconnection of the flexible link and straight mandrel sections.

It will be evident from the foregoing that by virtue of the design, arrangement and cooperation between members that a number of advantages and unique features are realized. In typical operation, the stem 18 is threaded to a mandrel rod leading from a hydraulic cylinder. The tube to be bent is inserted over the mandrel and clamped to a bending die, then as the tube is bent the mandrel is held stationary. Upon completion of the bending operation, the tube remains clamped in place and the mandrel is removed by means of the hydraulic cylinder so as to complete the entire operation. Due to the spacing between rings as afforded through the special design of the ball link members, a high degree of bending is made possible, but nevertheless the rings will retain a constant center line radius throughout due to the alignment between the spherical recess portions and outer peripheral surfaces of the spherical rings. Due to the particular constructional relationship between the ball links and spherical rings, the mandrel is of unusually high strength; in addition, the parts are preferably composed of a hard steel alloy and the spherical ring portions may be chromium plated to provide lasting service and good wear characteristics.

The ball detent assembly holds the flexible links in stiff, straight relation in alignment with the mandrel shank portion so as to permit fast loading of the links, and to prevent them from unduly wobbling and flopping around during assembly. Because the balls are free to rotate, it has been found that the mandrels wear more evenly so as to provide longer life and also enable formation of compound curvatures, or enable compound bending in any direction without having to form intermediate straight sections between the curves.

It is to be understood that the flexible link construction may be modified in a number of respects without departing from the invention, and for example, the particular curvature and configuration established between the end surfaces and outer surfaces of the rings may be varied as well as the particular form of interlocking engagement established between each spherical ring and socket end portion. Accordingly, any locking means equivalent to the preferred, complementary ledge and lock ring construction may be employed to properly lock the spherical rings in place in relation to the socket end portions. It is further to be understood that a number of other changes and modifications may be made in the particular design, arrangement and composition of elements comprising the present invention without departing from the scope thereof, as defined by the appended claims.

What is claimed is:

1. A universal tube bending mandrel comprising a series of outer ring members, and a corresponding series of inner ball link members connected together in end-to-end relation, each link having an expansible hollow female socket end portion at one end and a spherically shaped male end portion at its opposite end for interlocking engagement in the hollow female socket end of each link in succession, said female end portions being sized for disposition within said ring members and to be secured to said male end portions by said ring members, and locking means between said female socket end portions and said rings for locking said ring members on said female socket end portion in spaced, axial relation whereby said ring members are free to bend in any direction while maintaining a constant diameter.

2. A universal tube bending mandrel according to claim 1, each ball link divided throughout its length to provide for radial expansion thereof, and means at the line of division to prevent longitudinal separation of said ball links when in connected relation with said ring members.

3. A universal tube bending mandrel according to claim 1, each female end portion being longitudinally split at spaced circumferential intervals through its substantial length to provide for radial expansion thereof.

4. A universal tube bending mandrel comprising a series of spherical ring members, and a corresponding series of inner concentric ball link members connected together in end-to-end relation, each ball link having an expansible socket end portion at one end and a ball end portion at its opposite end for interlocking engagement with the socket end of each next ball link in succession, said socket end portions being sized for disposition within said spherical ring members and to be fastened to said ball end portion thereby, and locking means between said socket end portions and said rings for locking said ring members on said socket end portion in spaced, axial relation whereby said ring members are free to bend in any direction while maintaining a constant diameter.

5. A universal tube bending mandrel according to claim 4, the ends of said rings having inner curved surfaces complementary to the outer curvature of each next adjacent ring to provide for free relative bending movement therebetween.

6. A universal tube bending mandrel according to claim 4, each ball link member being further characterized by having an intermediate conical surface portion between the ball and socket end portion, and each socket end having a flared end surface movable into contact with the conical surface of each connected ball end portion thereby to limit the degree of bending between adjacent ball link members.

7. A universal tube bending mandrel according to claim 4, including outwardly biased detent members in the end of each ball, and a depression in the end of each socket to accommodate each respective detent member thereby to normally align said ring members in straight axial relation.

8. A universal tube bending mandrel according to claim 4, each ball link member being longitudinally split at least throughout its socket end portion to provide for radial expansion thereof.

9. A universal tube bending mandrel comprising a straight shank, a series of spaced ring members having outer convex surfaces, and a corresponding series of inner concentric ball link members connected together in end-to-end relation, each ball link having a longitudinally split, radially expansible socket end portion at one end and a ball end portion at its opposite end for interlocking engagement with the socket end of each next ball link in succession, said socket end portions being sized for disposition within said ring members to secure them to corresponding ball end portions, locking means between said socket end portions and said rings for locking said ring members on said socket end portion in spaced, axial relation whereby said ring members are free to bend in any direction while maintaining a constant diameter, and releasable aligning means between each ball and socket end portion to provide for interconnection between said ball and socket end portions in normally straight, axial relation.

10. A universal tube bending mandrel comprising, a straight shank, a series of spaced rings in the form of annular, thick-walled members of limited length having outer spherical-shaped surfaces and a corresponding series of inner concentric ball link members connected together in end-to-end relation with said straight shank, each ball link being divided along its length and having a socket end portion at one end and a ball end portion at its opposite end for interlocking engagement with the socket end of each next ball link in succession, said socket end portions being sized for disposition within said spherical ring members to secure them to corresponding ball end portions, and locking means between said socket end portions and said rings for locking said ring members on said socket end portion in spaced, axial relation whereby said ring members are free to bend in any direction while maintaining a constant diameter.

References Cited by the Examiner

UNITED STATES PATENTS

| 2,451,717 | 10/48 | Check | 153—63 |
| 2,962,077 | 11/60 | Condiff | 153—63 |

CHARLES W. LANHAM, *Primary Examiner*.